United States Patent
Valenzuela Del Rio et al.

(10) Patent No.: US 12,535,808 B2
(45) Date of Patent: Jan. 27, 2026

(54) REAL-TIME CALIBRATION FOR DETAILED DIGITAL TWINS

(71) Applicant: Siemens Schweiz AG, Zurich (CH)

(72) Inventors: Jose Valenzuela Del Rio, Orlando, FL (US); Heng Chi, Plainsboro, NJ (US)

(73) Assignee: Siemens Schweiz AG, Zurich (CH)

(*) Notice: Subject to any disclaimer, the term of this patent is extended or adjusted under 35 U.S.C. 154(b) by 507 days.

(21) Appl. No.: 18/146,680

(22) Filed: Dec. 27, 2022

(65) Prior Publication Data
US 2024/0210933 A1 Jun. 27, 2024

(51) Int. Cl.
G05B 23/02 (2006.01)
G05B 15/02 (2006.01)

(52) U.S. Cl.
CPC ......... *G05B 23/0275* (2013.01); *G05B 15/02* (2013.01); *G05B 2223/02* (2018.08)

(58) Field of Classification Search
None
See application file for complete search history.

(56) References Cited

U.S. PATENT DOCUMENTS

| | | | |
|---|---|---|---|
| 2017/0286572 A1* | 10/2017 | Hershey | B64F 5/60 |
| 2020/0078948 A1* | 3/2020 | Krause | G06F 3/0346 |
| 2022/0179374 A1 | 6/2022 | Kaberg Johard | |

OTHER PUBLICATIONS

Lu et al.; "Zonal Modelling for Thermal and Energy Performance of Large Space Buildings: A review"; Renewable and Sustainable Energy Reviews 133 (2020) 10241; ScienceDirect; http://www.elsevier.com/locate/rser.

Artiges Nils et al: "Calibrating models for MPC of energy systems in buildings using an adjoint-based sensitivity method", Energy, Elsevier, Amsterdam, NL, vol. 208, Nov. 28, 2019 (Nov. 28, 2019), XP086032262, ISSN 0378-7788, 001: 10.1016/J.ENBUILD.2019.109647.

* cited by examiner

*Primary Examiner* — Carlos R Ortiz Rodriguez

(57) ABSTRACT

Embodiments described below include a method for calibrating a digital twin, the digital twin being representative of a complex system governed by a set of parameters. The method includes receiving a subset of data from a plurality of sensors of the complex system then calculating an error that represents a difference in state between the digital twin and the complex system. In addition, a gradient of the calculated error is calculated and utilized to generate a set of candidate parameters for the complex system. The candidate parameters are generated using a gradient optimization. The candidate parameters are provided to the digital twin model and the error value is based on the candidate parameters. Steps may be repeated iteratively including calculating of the error and its gradient, generating of the candidate parameters, and applying the candidate parameter to the digital twin until the calculated error is smaller than a user-defined tolerance.

20 Claims, 5 Drawing Sheets

REAL-TIME CALIBRATION FOR DETAILED DIGITAL TWINS

TECHNICAL FIELD

This application relates to digital twins. More particularly, the application relates to real-time calibration of digital twins.

BACKGROUND

Digital Twins have garnered increased interest recently to addressing aspects of service, operation, and maintenance of complex systems. A digital twin is a system of processes defined in computer software which perform calculations and function that mimic the behavior of a real-world physical system. For a given set of states or circumstances, the digital twin will behave identically to the corresponding physical system. In order for a digital twin to accurately represent the underlying system, the states and parameters in the digital twin must be synchronized with the physical system, so that the digital twin accurately represents the current state of the system. To provide the greatest value, the digital twin will be calibrated to the state of the physical system in real time. Using digital twins, high-value use cases may be tested by applying the changes to the digital twin. When properly calibrated, the digital twin will reproduce the expected response of the real-world system to the test scenario. This may be performed without the effort and disruption created by implementing tests on the physical system. It is therefore important that during operations the digital twin is synchronized to the physical system in real time. Real-time use cases include continuous real-time operations optimizations and real-time determination and diagnosis of the health of the real-world system. Conventional synchronization techniques present limitations which prevent the ability to calibrate digital twins for complex systems in real-time. Computational expense, or processing complexity resulting from the large number parameters associated with a complex system hamper the ability to update and process changes in the digital twin in real-time. Improved methods and systems are desired.

To establish meaningful value, It is paramount that digital twin representing complex system reflect the physical asset as faithfully as possible. Therefore, a common approach for these twins are hybrid models that combine physics-based and data-based approaches. Specifically, these hybrid models are often calibrated against sensor data.

Additionally, a good portion of the Digital Twin-enabled use cases requires the assessment of physical fields (up to 3D in the space domain). For instance, for accurately assessing Building's energy consumption is crucial to replicate spatial distributions such temperature fields, pipe leakages, heating loads. These detailed up-to-3D Digital Twins are large, and therefore, computationally expensive which hinders their real-time calibration that opens some high-value use cases.

To produce real-time accurate representations of the complex system behavior, a quick reliable calibration is paramount. This invention targets the calibration of detailed space-rich (up to 3D) digital twins in real-time with sensor data.

SUMMARY

Embodiments described below include a method for calibrating a digital twin, the digital twin being representative of a complex system whose state is governed by a set of model parameters. The method includes receiving a subset of data from a plurality of sensors of the complex system then calculating an error that represents a difference in state between the digital twin and the complex system. In addition, a gradient of the calculated error is calculated and utilized to generate a set of candidate parameters for the complex system. The candidate parameter may be generated based on a gradient optimization. The set of candidate parameters is provided to the digital twin model and the error value is based on the candidate parameters. Steps of this method may be repeated iteratively including calculating of the error and the gradient of the calculated error, generating of the candidate parameters, and applying of the candidate parameter to the digital twin until the calculated error is smaller than a user-defined tolerance.

According to some described embodiments, the digital twin leverages a differentiable model to provide real-time calibration of the digital twin. Candidate parameters may be generated by differentiating the hybrid digital twin, for example one or more machine learning networks exploiting backpropagation based on the gradient of the error to rapidly generate each set of candidate parameters. Some embodiments may be used to calibrate a digital twin of a complex system in the form of a space-rich 3D system. For example, digital twins may be calibrated in real-time for a building temperature control system. The use of differentiable, parametric models to evaluate digital twin outputs allows for rapid evaluations enabling iterative evaluation of candidate parameters to calibrate the digital twin to closely reflect the associated physical system.

According to some embodiments, systems are provided for calibration of a digital twin of a physical complex system. The systems include a computer processor in communication with a non-transitory memory. The non-transitory memory stores instructions that when executed by the computer processor cause the computer processor to perform the steps of creating a digital twin which virtually duplicates the physical complex system. The system receives sensor data from the physical complex system and calculates an error value the represents a difference between output of the digital twin and the present state of the physical complex system. A gradient of the error value is also determined to allow for gradient optimization to generate an updated candidate parameter value for the digital twin model. An updated output from the digital twin is evaluated based on the updated candidate parameter and used to recalculate the error value and the gradient of the error value based on the updated output of the digital twin. The evaluation of updated candidate parameters may be iteratively repeated until the resultant error value is smaller than a user defined tolerance value.

The digital twin model is established as a parametric differentiable model for generating a digital twin output based on the candidate parameters which are in turn based on a sub-set of sensor data generated by the physical complex system. The parametric differentiable model may be a Proper Orthogonal Decomposition with Interpolation (PODI) Reduced Order Model (ROM) in some embodiments. To generate updated parameters for evaluation, a gradient optimization may be performed utilizing the error value and its associated gradient. Systems for calibrating digital twins may calibrate digital twins representative of a space rich-3D system, such as temperature field, humidity and pollutant control or energy usage application for large buildings. Data relating to the space-rich 3D system may be obtained from sensors situated in the space. For example, sensors may include temperature sensors, humidity sensors, occupancy sensors, and the like, Embodiments of the present invention provide calibrated digital twins that faithfully mimic their real-world counterparts. Well calibrated digital twins allow for users to test scenarios in the digital twin to accurately display how the counterpart physical system will respond to a proposed change. Various what-if scenarios may be tested without affecting the system during operation reducing downtime and inefficiencies. By keeping the digital twin calibrated in real-time, users are always provided with the most recent and accurate feedback available from the digital twin.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
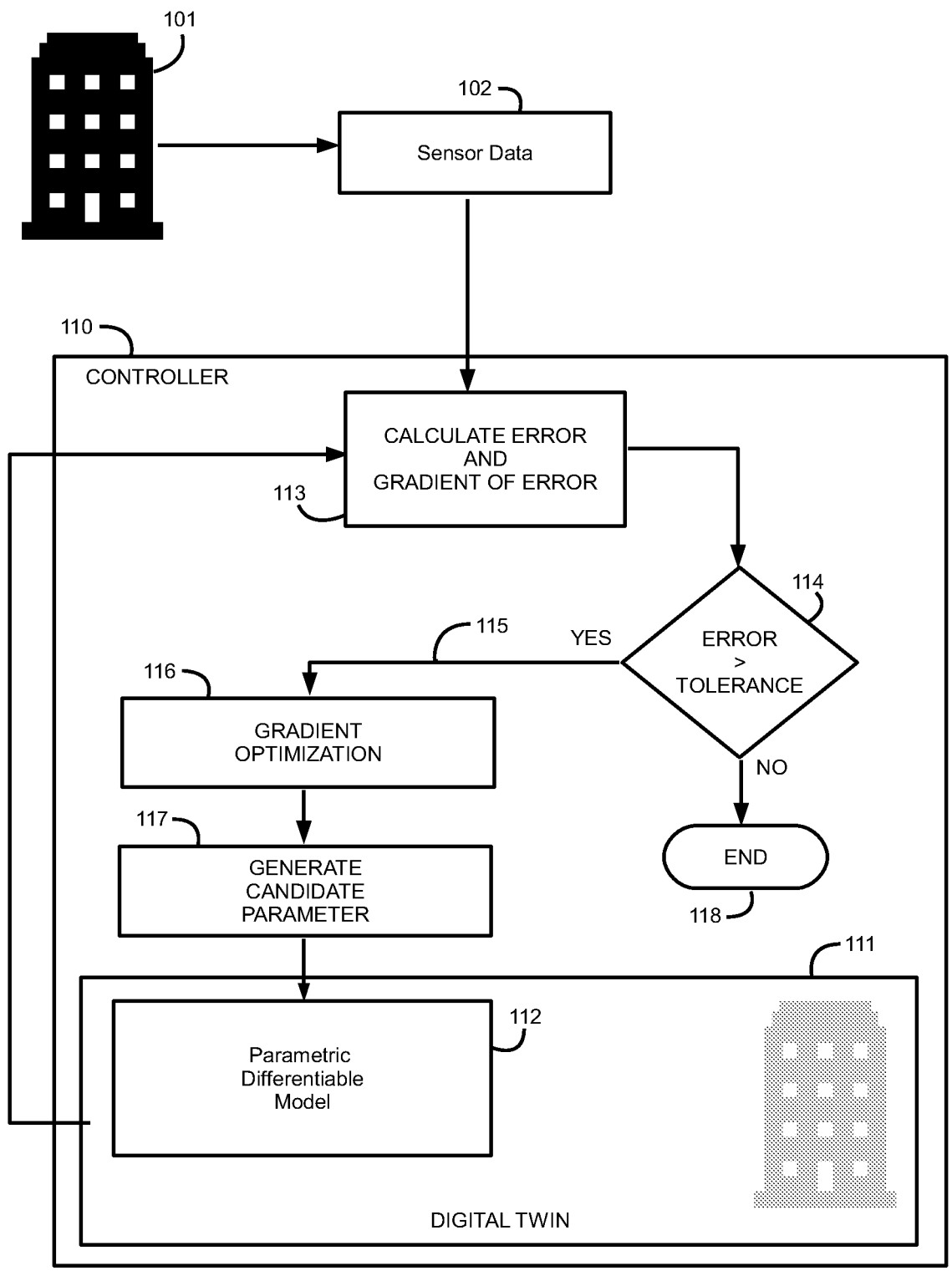
FIG. 1 is a block diagram of an architecture for real-time calibration of a digital twin according to embodiments of this disclosure.

Descriptions in this application will be explain with reference to complex modeling scenarios such as those found when considering thermal and energy performance in large space buildings. Conventionally, efforts have focused on design, but no on operations. The reason for this is that models needed to evaluate operations must perform in real-time. Known techniques using hybrid models that are tuned with population-based algorithms are not well suited for real-time calibration. The use of large, detailed models based on population-based algorithms is slow because these models are not differentiable. While differentiable building models have been used, they have only utilized data-driven approaches which typically output aggregated building KPIs rather than space-rich physical fields, (e.g., 1D, 2D, or 3D distributions for pressure, temperature, or any other variable).

Embodiments that will be described herein calibrate differentiable space-rich digital twins in real-time against sensor data. Embodiments utilize digital twins that are hybridmodels with up to 3D details in the space domain. The differentiability of these digital twins is a key feature to allow efficient gradient-based optimizers to calibrate in real-time while processing large space-rich digital twins. The use of the differentiable models on a large model context enables the real-time calibration by avoiding slow population-based optimizers or the inefficient use of gradient-based optimizers in which gradients are calculated with increasing Digital Twin model evaluations.

The described real-time calibration for the Digital Twin embodies an ongoing iterative process. This calibration process computes a cost function defining the calibration error between the physical and digital asset as well as its gradient. The cost gradient is evaluated efficiently because the gradient is provided as output by the differentiable Digital Twin. The calibration process generates a new set of Digital Twin parameter candidate which is fed again to the Digital Twin to start a new calibration iteration. The calibration iteration process finalizes when the error is smaller than a user-defined tolerance. When conditions in the physical system change as evidenced by changes in the captured sensor data, the iterative calibration process will restart as needed.

The embodiments herein provide the advantage of the real-time calibration of accurate space-rich digital twins. The key for the real-time calibration for these large models is the models' differentiability. Without the model differentiability, prior calibration techniques have relied on slow population-based optimizers whose convergence time is dramatically longer; especially for some Operation applications when a large Digital Twin with details is needed. Other calibration alternatives for Digital Twins lacking model differentiability is to use gradient-based optimizers; however, this approach is also slower than the proposed invention because additional large model evaluations are needed to assess the gradient with numerical differentiation.

The real-time calibration presented here enables the Digital Twin to address new building Operation use cases including advanced real-time health & diagnostic, or continuous optimal building control among other applications for which current known solutions/products (large detailed digital twins) are not practicable in real-time. These new use cases provide system operators with more efficient operations and more accurate service planning which result in more system availability and savings to the operators.

FIG. 1 is a block diagram of a digital twin calibration system according to an embodiment of this disclosure. A real-world physical system is illustrated as a building 101 having a controller 110 for controlling the ventilation system of the building 101. The ventilation system of building 101 defines a complex system involving a space-rich 3-dimensional (3D) domain. This domain includes a plurality of sensors for monitoring air conditions throughout building 101 and the heating, air conditioning, and ventilation components that condition, transport, and circulate the air throughout the building 101.

Not all data generated by the building 101 can be evaluated in real-time so a subset of all sensor data 102 is extracted from the building 101. A digital twin of the building 111 includes a parametric differentiable model 112 that uses parameters from the building system to generate outputs representative of the real-world building 101. Digital twin 111 may be part of the controller 110, or digital twin 111 may be housed in a standalone computing platform like that described below with respect to FIG. 5. Based on the most recent set of available building parameters, the state of the digital twin is calculated and compared to the real-world data received from building 101 embodied in the subset of sensor data 102. An error is calculated based on a difference between the outputs of the digital twin 111 and the subset of sensor data 102. Because the parametric model 112 is differentiable, the gradient of the error is also calculated 113.

The calculated error is compared to a user defined tolerance 114. If the error is greater than the tolerance 115, then a gradient optimization is performed 116 which seeks to minimize error based on the gradient of the error. A set of candidate parameters is generated 117 with the intention that those candidate parameters will reduce the error when processed by the parametric differentiable model 112. That is, the outputs of the digital twin 111 will be more reflective of the real-world state of the building 101.

The candidate parameter is provided to the parametric differentiable model 112 to produce outputs that are compared to the sensor data 102 from the real-world system and an updated error and gradient of the error is calculated 113. This process is repeated until the calculated error is less than the user defined tolerance and the process ends 118 until changes occur in the state of the physical system and the calibration process resumes. At this point, the digital twin 111 is calibrated to the current state of the physical system (building 101). Due to the nature of the parametric and differentiable model 112, the iterations to evaluate candidate parameters may be evaluated quickly enough to allow calibration of the digital twin 111 in real-time. This ensures that the digital twin 111 is a faithful space-rich 3-dimensional representation of the physical system it represents.

Figure 2:
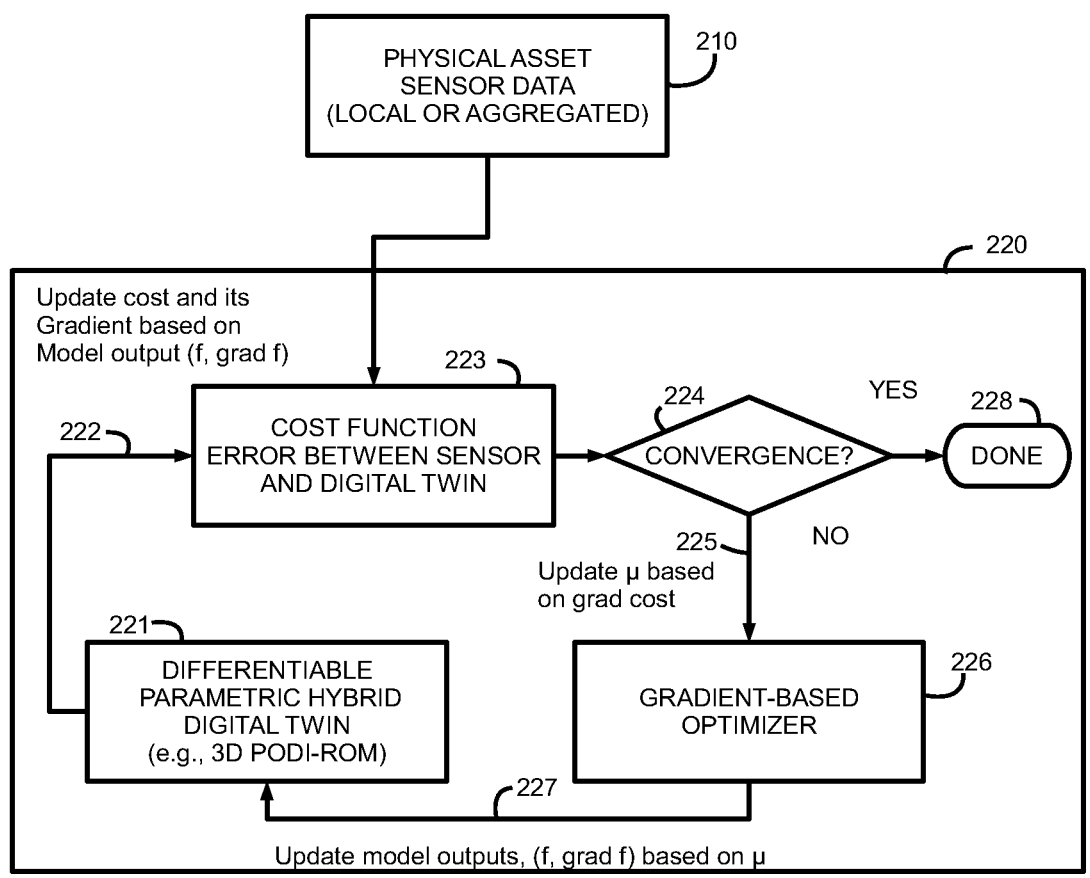
FIG. 2 is flow diagram for an iterative process for calibration of a digital twin according to embodiments of this disclosure.

FIG. 2 is a block diagram showing a method for calibrating a digital twin with its real-world counterpart according to embodiments of this disclosure. While the embodiment described with respect to FIG. 1 involved a building system, methods and systems of this disclosure are not limited to this example. Other physical systems where space richness is paramount that may be represented by a digital twin may utilize these methods and system to calibrate a digital twin in real-time. The method for calibrating the digital twin 221 may be performed by a computing platform 220 such as the computer system depicted in FIG. 5 hereinbelow.

The physical asset generates data as the output of sensors. The sensor data may be local or aggregated data 210. The sensor data 210 are provided to the computing platform 220. Digital twin generates outputs 221. The digital twin 221 embodies a differentiable, parametric, hybrid digital twin, which combines sensor data with physics calculations. Because the model is differentiable, the model's output may also be characterized by a gradient of the model output 222. Based on the output of the digital twin 221, a cost function 223 is evaluated to calculate an error representing the difference between the current state of the physical asset 210 and the output of the digital twin model 221. The gradient of the cost function 223 is calculated along with the value of the cost function itself. A user defined tolerance is defined as a maximum acceptable value for the error calculated by the cost function 223.

Convergence 224 occurs when the calculated error is less than or falls within the user defined tolerance. Convergence 224 indicates that the digital twin model 221 is faithfully providing outputs resembling the state of the physical asset 210. When within tolerance, the calibration process ends 228 and the digital twin is calibrated until the state of the physical system changes and the calibration process repeats. If convergence has not occurred and the calculated error is greater than or outside of the user defined tolerance, then a gradient-based optimization 226 is performed to update a set of parameters µ 225 which are provided as inputs to the parametric model associated with the digital twin 221. The model outputs and their gradient are updated 227 based on parameters µ and are again evaluated by cost function 223 to update the error and check for convergence 224. The process of updating parameters and evaluating them in the digital twin model 221 is iteratively repeated until convergence 224 is achieved.

The iterative process of FIG. 2 may be performed in real-time due to the ability of the parametric differentiable model to evaluate its outputs quickly. According to one embodiment, the model may be designed as a Proper Orthogonal Decomposition with Interpolation (PODI) Reduced Order Model (ROM), which allows for fast evaluation complex systems using sparse or a subset of the total amount of data represented by the system.

Figure 3:
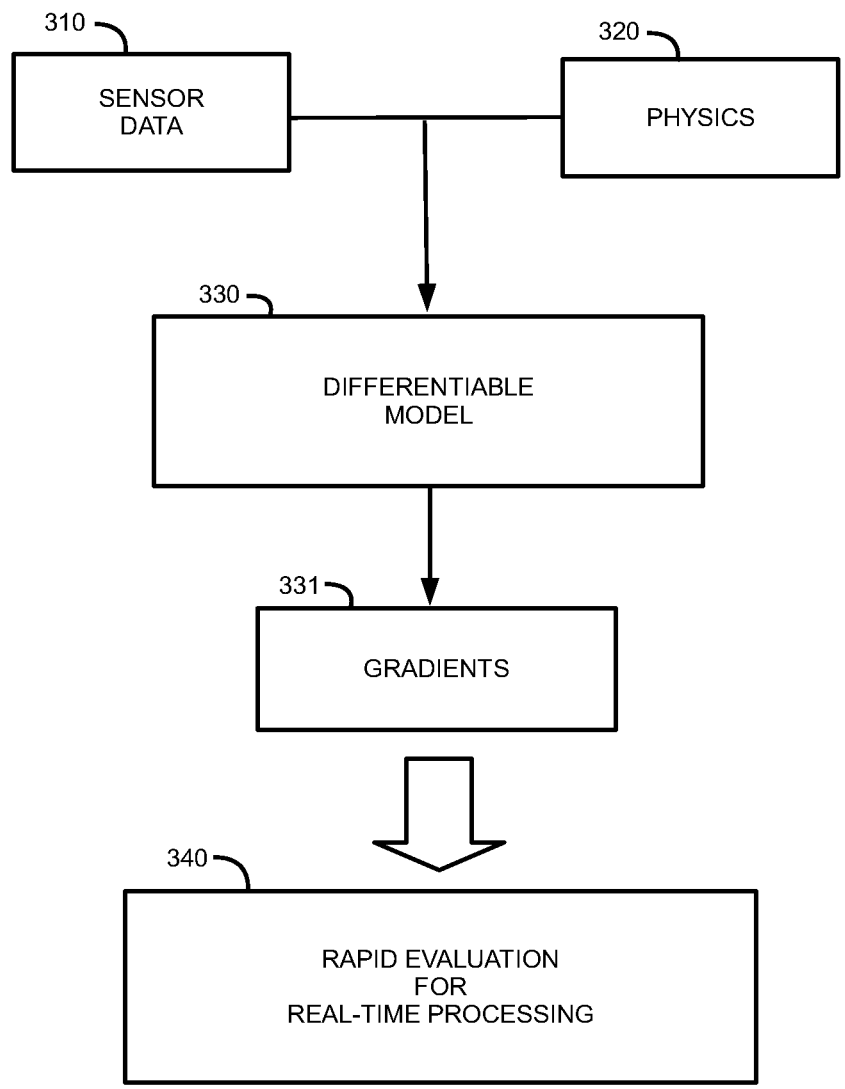
FIG. 3 is a high-level block representation of an architecture for a differentiable hybrid model according to embodiments of this disclosure.

FIG. 3 is a high-level representation of a hybrid differentiable digital twin model according to embodiments of this disclosure. The hybrid model combines the use of data 310 (from offline simulation, experimentation, and/or sensors) with physics-modelling aspects 320 to form a differentiable model 330. The differentiability of the model allows the computation of gradients 331 associated with the model outputs. Digital twin and the associated presented calibration leverages the sensor data 310 to exploit reduced order models which can predict data for the gaps in information from the physical system. This evaluation is performed faster than conventional methods such as population-based models and may be used to achieve real-time updates or calibration to the digital twin implemented by the model.

Figure 4:
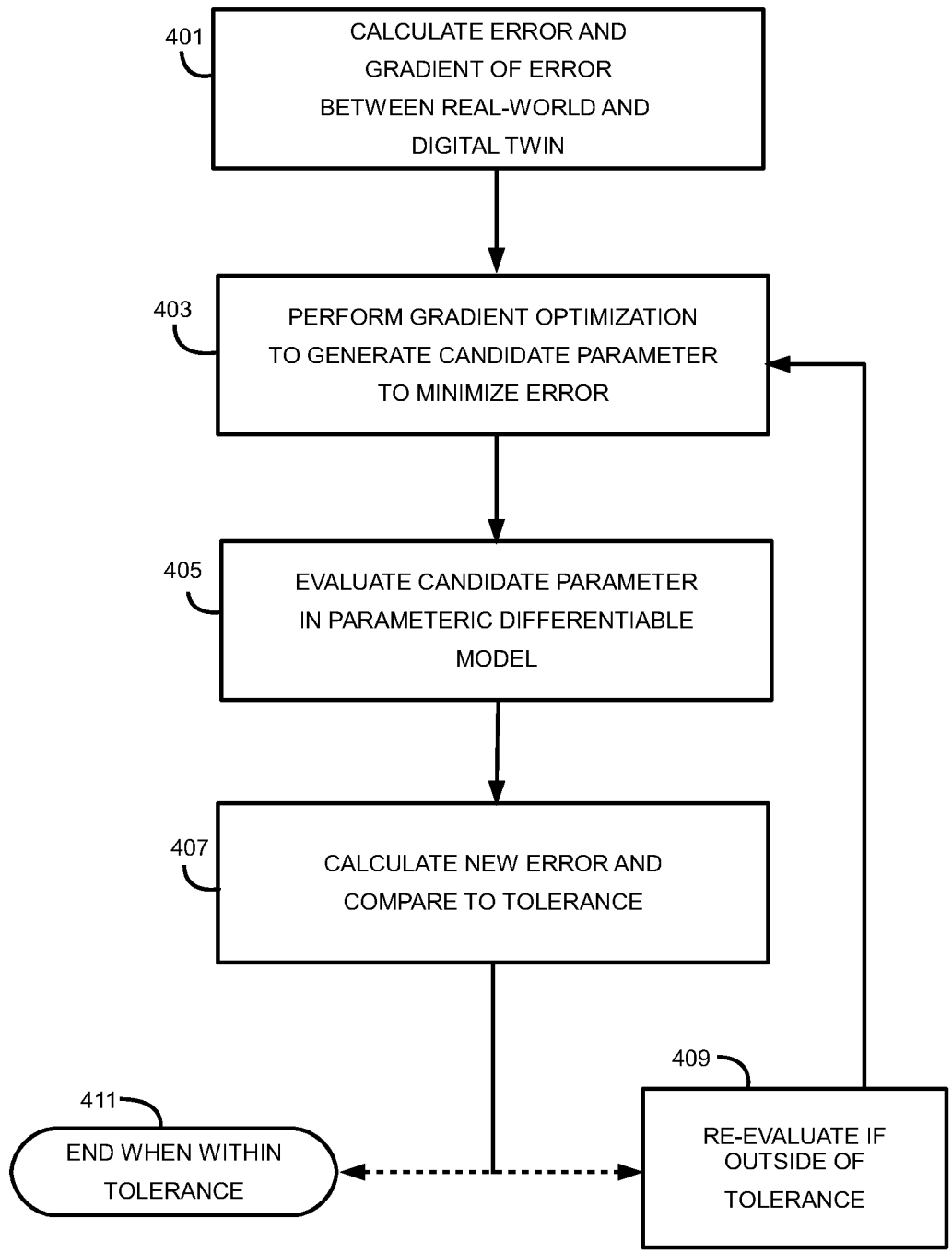
FIG. 4 is a process flow diagram of a method for calibration of a digital twin according to embodiments of this disclosure.

FIG. 4 is a process flow diagram illustrating a method of calibrating a digital twin of a complex system according to embodiments of this disclosure. At step 401, the output from a hybrid parametric differentiable digital twin model is compared with real-world data of a physical asset corresponding to the digital twin. Based on the comparison, an error is calculated that represents the difference between the digital twin and the real-world asset. Because the model is differentiable, the gradient of the outputs and the gradient of the error are calculated along with the model outputs and error calculation, respectively. A gradient optimization is performed to generate a candidate parameter or set of parameters of the digital twin model that will minimize the calculated error 403. The candidate parameter or set of parameters is input to the digital twin model and evaluated to produce model outputs and gradients 405. The error is updated based on the new outputs and compared to a user defined tolerance 407. When the error calculated with the new parameter or set of parameters is within the user defined tolerance the method ends 411 until sensor data from the physical system changes and the digital twin is calibrated again. Calibration is an ongoing process that updates the digital twin as the state of the corresponding physical system changes. On a condition that the updated error is outside of the user defined tolerance 409, then the process is repeated to generate a new candidate parameter or set of parameters 403. The steps of generating new candidate parameters 403, evaluating the parameters in the digital twin models 405, and calculating an updated error value 407, are iteratively performed until the updated error falls within the user defined tolerance.

Figure 5:
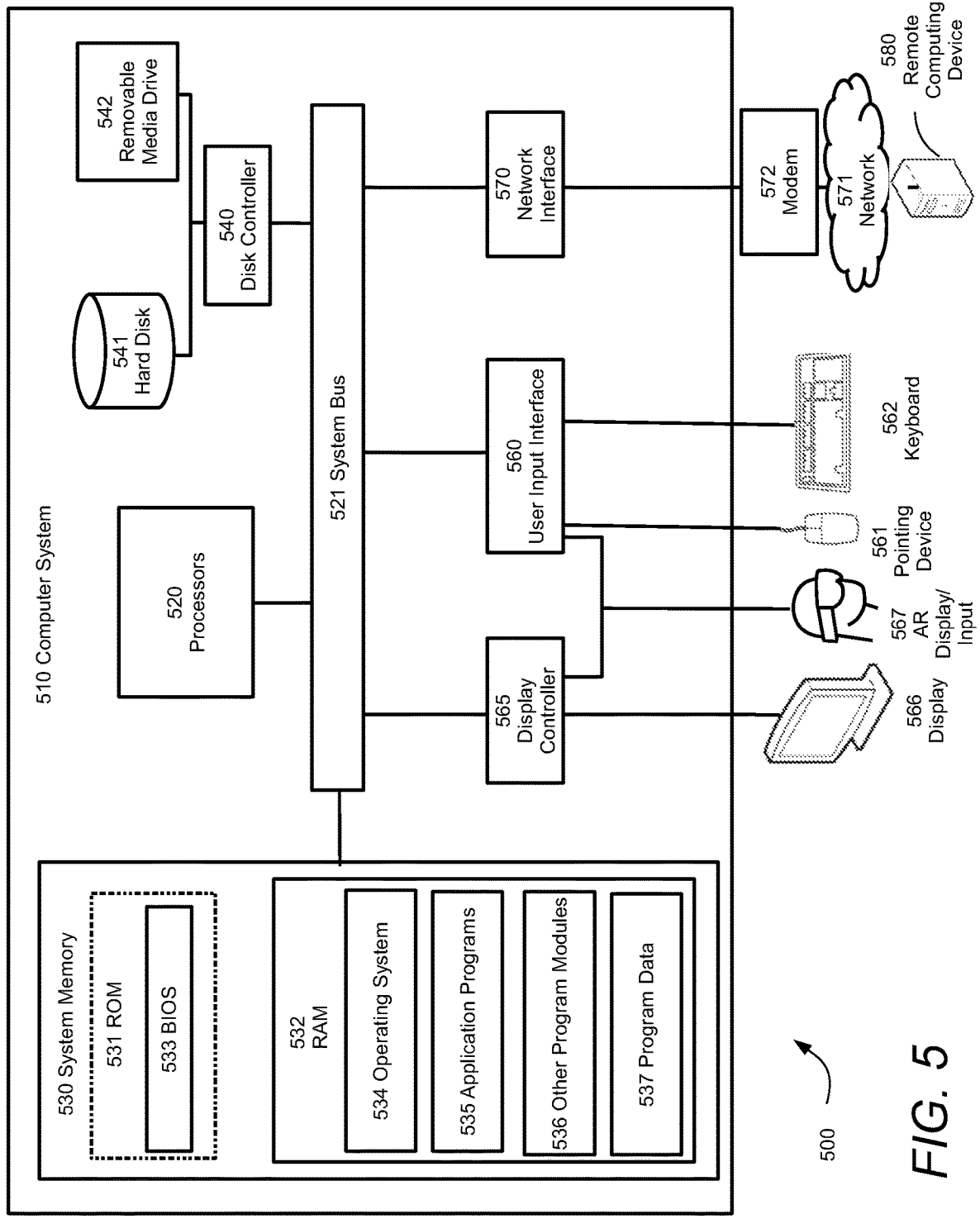
FIG. 5 is a block diagram of a computing system for implementing the calibration of a complex system according to aspects of embodiments described in this disclosure.

FIG. 5 illustrates an exemplary computing environment 500 within which embodiments of the invention may be implemented. Computers and computing environments, such as computer system 510 and computing environment 500, are known to those of skill in the art and thus are described briefly here.

As shown in FIG. 5, the computer system 510 may include a communication mechanism such as a system bus 521 or other communication mechanism for communicating information within the computer system 510. The computer system 510 further includes one or more processors 520 coupled with the system bus 521 for processing the information.

The processors 520 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting, or transmitting information for use by an executable procedure or an information device, and/or by routing the information to an output device. A processor may use or comprise the capabilities of a computer, controller, or microprocessor, for example, and be conditioned using executable instructions to perform special purpose functions not performed by a general-purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 5, the computer system 510 also includes a system memory 530 coupled to the system bus 521 for storing information and instructions to be executed by processors 520. The system memory 530 may include computer readable storage media in the form of volatile and/or nonvolatile memory, such as read only memory (ROM) 531 and/or random-access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, other program modules 536 and program data 537.

The computer system 510 also includes a disk controller 540 coupled to the system bus 521 to control one or more storage devices for storing information and instructions, such as a magnetic hard disk 541 and a removable media drive 542 (e.g., floppy disk drive, compact disc drive, tape drive, and/or solid-state drive). Storage devices may be added to the computer system 510 using an appropriate device interface (e.g., a small computer system interface (SCSI), integrated device electronics (IDE), Universal Serial Bus (USB), or FireWire).

The computer system 510 may also include a display controller 565 coupled to the system bus 521 to control a display or monitor 566, such as a cathode ray tube (CRT) or liquid crystal display (LCD), for displaying information to a computer user. The computer system includes an input interface 560 and one or more input devices, such as a keyboard 562 and a pointing device 561, for interacting with a computer user and providing information to the processors 520. The pointing device 561, for example, may be a mouse, a light pen, a trackball, or a pointing stick for communicating direction information and command selections to the processors 520 and for controlling cursor movement on the display 566. The display 566 may provide a touch screen interface which allows input to supplement or replace the communication of direction information and command selections by the pointing device 561. In some embodiments, an augmented reality device 567 that is wearable by a user, may provide input/output functionality allowing a user to interact with both a physical and virtual world. The augmented reality device 567 is in communication with the display controller 565 and the user input interface 560 allowing a user to interact with virtual items generated in the augmented reality device 567 by the display controller 565. The user may also provide gestures that are detected by the augmented reality device 567 and transmitted to the user input interface 560 as input signals.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium, such as a magnetic hard disk 541 or a removable media drive 542. The magnetic hard disk 541 may contain one or more datastores and data files used by embodiments of the present invention. Datastore contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

The computing environment 500 may further include the computer system 510 operating in a networked environment using logical connections to one or more remote computers, such as remote computing device 580. Remote computing device 580 may be a personal computer (laptop or desktop), a mobile device, a server, a router, a network PC, a peer device, or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers, and processes can be implemented using hardware components, software components, and/or combinations thereof.

What is claimed is:

1. A method for calibrating a digital twin, the digital twin representative of a physical complex system having a plurality of sensors and controllers of a building control system, the method comprising:
   receiving a subset of data from the plurality of sensors of the physical complex system;
   calculating an error representative of a difference in state between the digital twin and the physical complex system;
   calculating a gradient of the calculated error;
   generating a set of candidate parameters of the physical complex system based on a gradient optimization based on the calculated error and the gradient of the calculated error;
   applying the set of candidate parameters to the digital twin;
   recalculating the error based on the candidate parameters; and
   in response to recalibrating the error, automatically adjusting at least one operational parameter of the physical complex system via at least one of the controllers of the building control system to achieve a desired performance objective.

2. The method of claim 1, further comprising:
   iteratively repeating the calculating of the error and the gradient of the calculated error, the generating of the candidate parameter, and the applying of the candidate parameter to the digital twin until the calculated error is smaller than a user-defined tolerance.

3. The method of claim 1, further comprising:
   repeating the iterative steps on a condition that a state of the physical complex system changes.

4. The method of claim 1, wherein the digital twin is a differentiable model.

5. The method of claim 1, further comprising:
   generating the candidate parameter using a machine learning network using backpropagation based on the gradient of the error.

6. The method of claim 1, wherein the complex system is a space rich 3D system.

7. The method of claim 2, wherein the iterations are performed to produce a calibrated digital twin in real time.

8. The method of claim 1, wherein the digital twin model is a parametric model.

9. The method of claim 1, further comprising:
   inputting a proposed scenario into the digital twin;
   analyzing an output of the digital twin; and
   implementing the proposed scenario in the physical complex system based on the analysis.

10. A system for calibration of a digital twin of a physical complex system having a plurality of sensors and controllers of a building control system, the system comprising:
    a computer processor in communication with a non-transitory memory, the non-transitory memory storing instructions that when executed by the computer processor cause the computer processor to perform the steps of:
    creating a digital twin which virtually duplicates the physical complex system;
    receiving sensor data from the plurality of sensors of the physical complex system;

calculating an error value representative of a difference between an output of the digital twin and the state of the physical complex system;

determining a gradient of the error value;

generating a set of candidate parameters for an input to the digital twin based on the error value and the gradient of the error value;

producing an updated output from the digital twin based on the candidate parameters;

recalculating the error value and the gradient of the error value based on the updated output of the digital twin; and in response to recalibrating the error value and the gradient of the error value, automatically adjusting at least one operational parameter of the physical complex system via at least one of the controllers of the building control system to achieve a desired performance objective.

11. The system of claim 10, further comprising:

computer instructions stored in the non-transitory memory, that when executed by the computer processor cause the computer processor to perform the steps of:

iteratively repeating calculating the error value, generating a set of candidate parameters, updating the output of the digital twin and recalculating the error value until the recalculated error value is smaller than a user defined tolerance value.

12. The system of claim 10 wherein the digital twin comprises:

a parametric differentiable model for generating a digital twin output based on a combination of physics-based models and data selected from one or more of: a sub-set of sensor data generated by the physical complex system, experimental data, and simulation results.

13. The system of claim 12, wherein the parametric differentiable model includes a Reduced Order Model (ROM).

14. The system of claim 10, further comprising:

computer instructions stored in the non-transitory memory, that when executed by the computer processor cause the computer processor to perform the steps of:

performing a gradient optimization to generate the set of candidate parameters for the input to the digital twin.

15. The system of claim 10 further comprising:

computer instructions stored in the non-transitory memory, that when executed by the computer processor cause the computer processor to perform the steps of:

generating the set of candidate parameters using a machine learning network using backpropagation based on the gradient of the error.

16. The system of claim 10, wherein the physical complex system is a space-rich 3D system.

17. The system of claim 16, wherein the space-rich 3D system is a building thermal performance profile.

18. The system of claim 16, wherein the space-rich 3D system is a building energy usage profile.

19. The system of claim 10, further comprising instructions that when executed by the computer processor cause the computer processor to:

receive a proposed scenario at the digital twin;

analyzing at least one of the output or the updated output of the digital twin; and implementing the proposed scenario in the physical complex system based on the analysis.

20. The system of claim 19, further comprising instructions that when executed by the computer processor cause the computer processor to:

generate the proposed system based on data received from one of temperature sensors and humidity sensors for a climate system of a large building.

* * * * *